(12) United States Patent
Neisen

(10) Patent No.: US 6,354,802 B1
(45) Date of Patent: Mar. 12, 2002

(54) PROPELLER ASSEMBLY INCLUDING A SPIRAL WOUND SPRING

(75) Inventor: Gerald F. Neisen, Rockport, TX (US)

(73) Assignee: Bombardier Motor Corporation of America, Grant, FL (US)

( * ) Notice: Subject to any disclaimer, the term of this patent is extended or adjusted under 35 U.S.C. 154(b) by 0 days.

(21) Appl. No.: 09/547,007

(22) Filed: Apr. 11, 2000

(51) Int. Cl.[7] .................................................. B63H 1/28
(52) U.S. Cl. .................. 416/93 A; 416/135; 416/244 B
(58) Field of Search ............................ 416/135, 134 R, 416/131, 93 A, 244 B, 174; 440/71, 78

(56) References Cited

U.S. PATENT DOCUMENTS

| | | | | |
|---|---|---|---|---|
| 5,244,348 A | * | 9/1993 | Karls et al. | 416/204 R |
| 5,322,416 A | * | 6/1994 | Karls et al. | 416/204 R |
| 5,484,264 A | * | 1/1996 | Karls et al. | 416/204 R |
| 5,630,704 A | * | 5/1997 | Gilgenbach et al. | 416/134 R |
| 6,193,572 B1 | * | 2/2001 | Neisen | 440/49 |

* cited by examiner

*Primary Examiner*—Edward K. Look
*Assistant Examiner*—James M McAleenan
(74) *Attorney, Agent, or Firm*—Armstrong Teasdale LLP

(57) ABSTRACT

A propeller assembly that includes, in an exemplary embodiment, a spring for securing a propeller to a propeller shaft is described. In the exemplary embodiment, the propeller assembly includes a thrust bearing which tightly fits to an inclined surface of the propeller shaft. The thrust bearing includes a hub mating surface which forms a tight fit with one end of a hub of the propeller. The propeller hub has a cylindrical shape, and a plurality of blades extend from an outer surface of the hub. A bore extends through the propeller hub, and the spring fits securely within the hub bore. The spring is located within the propeller hub bore and is secured, e.g., welded, at one end to an interior surface of the hub. The assembly further includes a washer and a nut which engages to a threaded end of the propeller shaft.

20 Claims, 2 Drawing Sheets

PROPELLER ASSEMBLY INCLUDING A SPIRAL WOUND SPRING

BACKGROUND OF THE INVENTION

The invention relates generally to marine engines, and more particularly, to propeller hubs.

Outboard engines include a drive shaft which extends from the engine power head, through an exhaust case, and into an engine lower unit. The lower unit includes a gear case, and a propeller shaft extends through the gear case. Forward and reverse gears couple the propeller shaft to the drive shaft. The drive shaft, gears, and propeller shaft sometimes are referred to as a drive train.

A propeller is secured to and rotates with the propeller shaft. Torque from the propeller is transmitted to the shaft. Specifically, propeller hub assemblies transmit torque to the propeller shaft. Exemplary propeller hub assemblies include cross bolts, keys, shear pins, plastic hubs, and compressed rubber hubs. Such hub assemblies should have sufficient strength or stiffness so that during normal engine operations, very few losses occur between the propeller shaft and the propeller. Such hub assemblies, however, also should be resilient so that the engine drive train is protected in the event of an impact, e.g., if the propeller hits a log or rock.

BRIEF SUMMARY OF THE INVENTION

These and other objects may be attained by a propeller assembly that includes, in an exemplary embodiment, a spiral wound spring for securing a propeller to a propeller shaft. In the exemplary embodiment, the propeller assembly includes a thrust bearing which tightly fits to an inclined surface of the propeller shaft. The thrust bearing includes a hub mating surface which forms a tight fit with one end of a hub of the propeller.

The propeller hub has a cylindrical shape, and a plurality of blades extend from an outer surface of the hub. A bore extends through the propeller hub, and the spring fits securely within the hub bore. The spring is secured, e.g., welded, at one end to an interior surface of the hub. The assembly further includes a washer and a nut which engages to a threaded end of the propeller shaft.

To secure the propeller assembly to the propeller shaft, the thrust bearing is pushed over the propeller shaft and into tight fit with the shaft inclined surface. The propeller hub is pushed over the propeller shaft until the one end of the hub is in tight fit with the hub mating surface of the thrust bearing. The propeller shaft extends through the spring, and an end of the spring opposite the spring end secured to the hub inner surface forms a tight fit with the propeller shaft. The washer and nut are then pushed over the propeller shaft and the nut is secured to the shaft so that the thrust bearing, hub, and washer are tightly secured to the propeller shaft.

During operation, the torque from the propeller shaft is transmitted through the spring to the propeller hub. The spring is stiff enough so that under normal operation, the propeller, spring, and propeller shaft rotate together. The tight fit between the thrust bearing, the propeller shaft, and propeller hub also facilitates transmission of torque from the shaft to the propeller hub. Upon the occurrence of an impact, the propeller shaft may rotate relative to the propeller hub. Under such operating conditions, the spring axially twists as the propeller shaft rotates relative to the hub. That is, the end of the spring secured to the hub rotates with the hub, and the end of the spring secured to the shaft rotates with the shaft. Relative rotation between the shaft and the hub results in axial twisting of the spring.

In the event that the impact is sufficient to loosen the initial tight fit between the thrust bearing and the hub, then the propeller shaft may continue to rotate relative to the hub until spring is completely rotated to its maximum rotation. If the forces are not sufficient to cause the spring to break, the spring then causes the propeller to once again rotate with the shaft in a limp home mode.

DETAILED DESCRIPTION OF THE INVENTION

The present invention is not limited to practice in connection with a particular engine, nor is the present invention limited to practice with a particular propeller configuration. The present invention can be utilized in connection with many engines and propeller configurations. For example, a propeller having three blades is described herein. The present invention, however, can be used in connection with propellers having any number of blades. Therefore, although the invention is described below in the context of an exemplary outboard engine and propeller configuration, the invention is not limited to practice with such engine and propeller.

Figure 1:
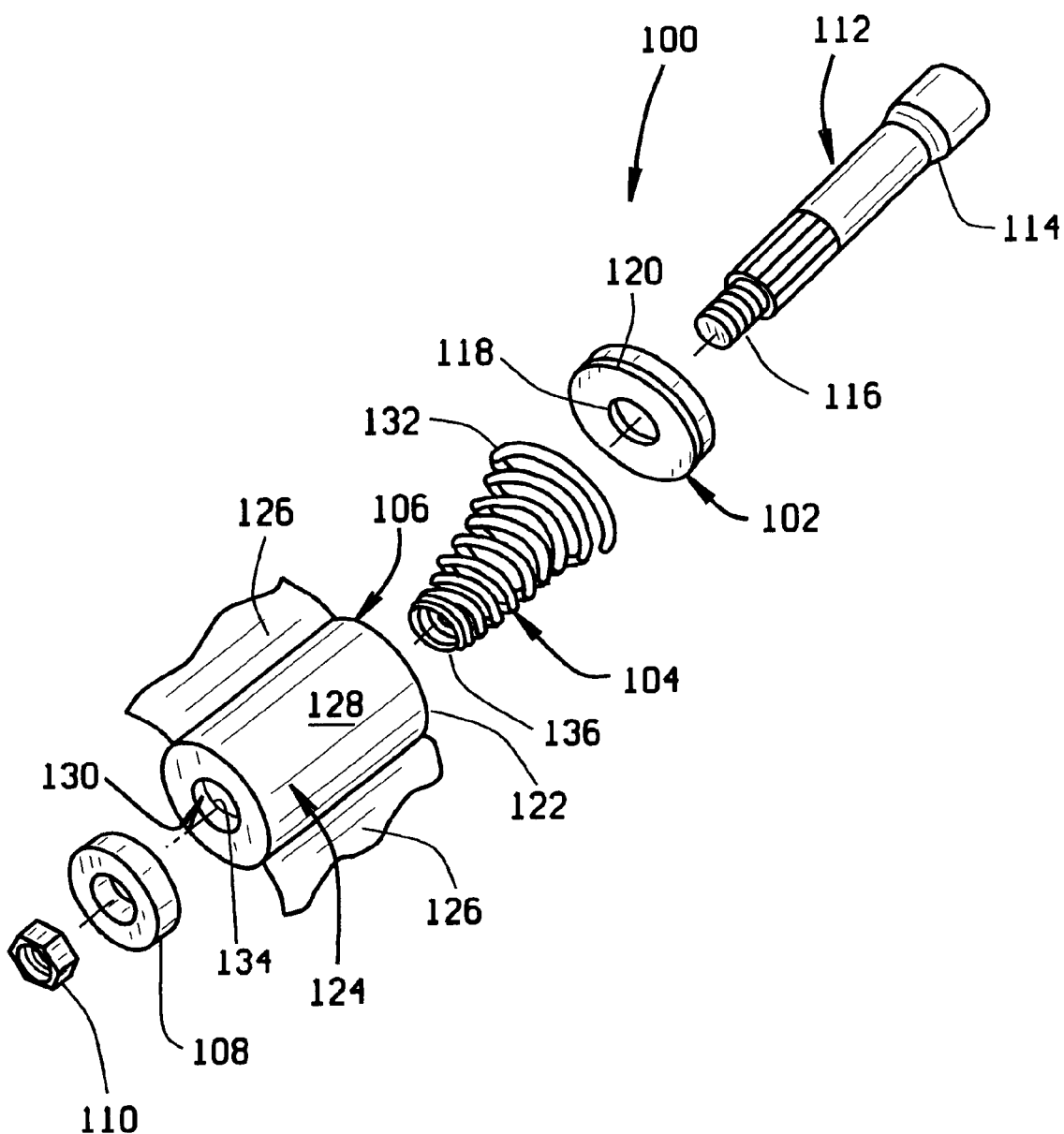
FIG. 1 is an exploded view of a propeller assembly in accordance with one embodiment of the present invention.

FIG. 1 is an exploded view of a propeller assembly 100. As shown in FIG. 1, assembly 100 includes a thrust bearing 102, a spring 104, a propeller 106, a washer 108, and a nut 110. A propeller shaft 112 including an inclined surface 114 and a threaded end 116 also is shown in FIG. 1. A bore 118 extends through thrust bearing 102, and bore 118 forms a tight fits to inclined surface 114 of shaft 112. Thrust bearing 102 also includes a hub mating surface 120 which forms a tight fit with one end 122 of a hub 124 of propeller 106.

Propeller hub 124 has a cylindrical shape, and a plurality of blades 126 extend from an outer surface 128 of hub 124. A bore 130 extends through propeller hub 124, and spring 104 fits securely within hub bore 130. Specifically, spring 104 is secured, e.g., welded, at one end 132 to an interior surface 134 of hub bore 130.

Spring 104, in one embodiment, is fabricated from spring steel and is spiral wound. Spring 104 is sufficiently stiff so that it does not twist under normal engine operations. The specific dimensions of spring 104, therefore, may vary depending upon the engine type and size. End 132 of spring 104 has a larger diameter than an end 136. Propeller 106 is fabricated, in one embodiment, from aluminum. Thrust bearing 102, in one embodiment, is fabricated from steel. Of course, other material can be used to fabricate components of assembly 100.

Figure 2:
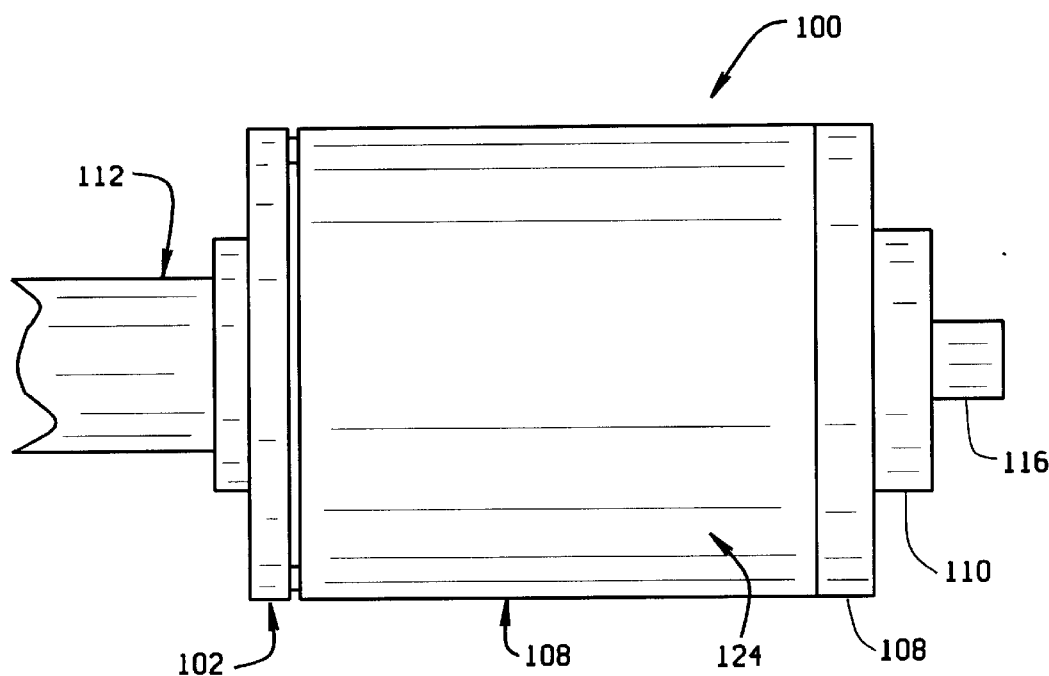
FIG. 2 is a side view of the propeller assembly shown in FIG. 1.

FIG. 2 is a side view of propeller assembly 100. As shown in FIG. 2, nut 110 is tightened against washer 108 so that propeller hub 124 is in a tight fit with thrust bearing 102. Propeller shaft 112 extends through thrust bearing 102, propeller hub 124, washer 108, and is threadedly engaged by nut 110.

Figure 3:
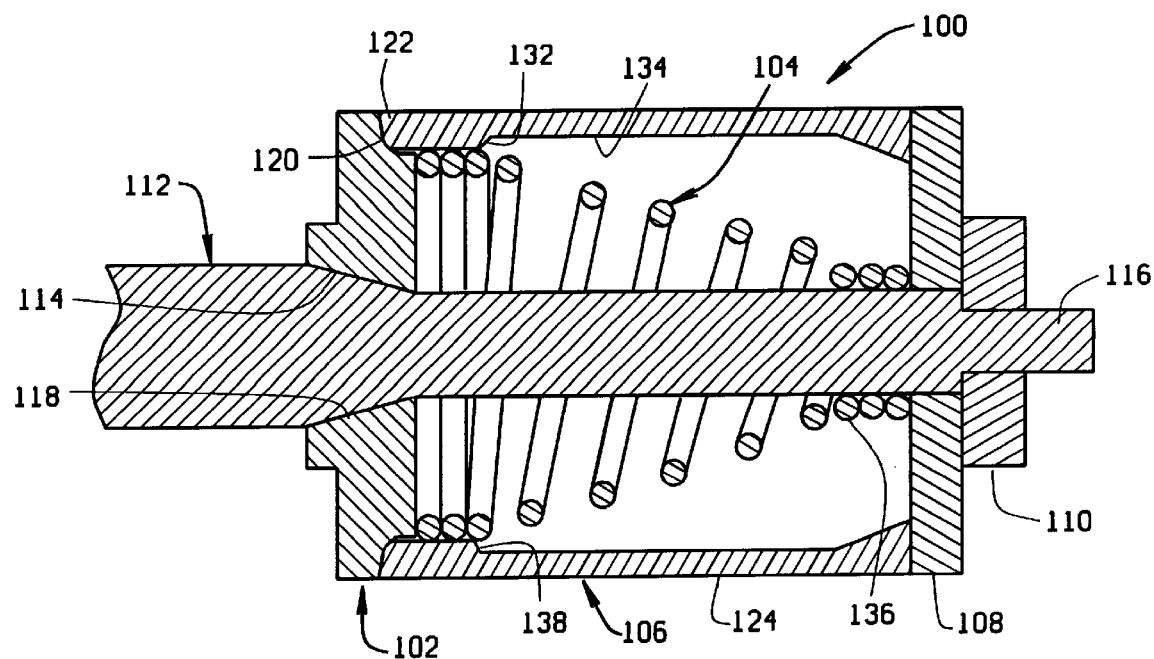
FIG. 3 is cross-sectional view of the propeller assembly shown in FIG. 1.

FIG. 3 is cross-sectional view of propeller assembly 100. As shown in FIG. 3, spring end 136 is in a tight fit with propeller shaft 112, and spring end 132 is secured, e.g., welded at a weld 138, to interior surface 134 of propeller hub 124. Also as shown in FIG. 3, end 122 of hub 124 is in tight fit with hub mating surface 120 of thrust bearing 102. Shaft 112 extends through thrust bearing bore 118 and forms a tight fit with bearing 102.

To secure propeller assembly 100 to propeller shaft 112, thrust bearing 102 is pushed over propeller shaft 112 and into tight fit with shaft inclined surface 114. Propeller hub 106 is pushed over propeller shaft 112 until end 122 of hub 124 is in tight fit with hub mating surface 120 of thrust bearing 102. Propeller shaft 112 extends through spring 104, and end 136 of spring 104 opposite spring end 132 secured to hub inner surface 134 forms a tight fit with propeller shaft 112. Washer 108 and nut 110 are then pushed over propeller shaft 112 and nut 110 is secured to shaft 112 so that thrust bearing 102, hub 106, and washer 108 are tightly secured to propeller shaft 112.

During operation, torque from propeller shaft 112 is transmitted through spring 104 to propeller hub 106. Specifically torque is transmitted from end 136 of spring 104 secured to propeller shaft 112 to end 132 of spring 104 secured to hub 106. The tight fit between thrust bearing 102, propeller shaft 112, and propeller hub 106 also facilitates transmission of torque from shaft 112 to propeller hub 106.

Upon the occurrence of an impact, propeller shaft 112 may rotate relative to propeller hub 106, and spring 104 axially twists as propeller shaft 112 rotates relative to hub 106. That is, spring end 132 secured to hub 106 rotates with hub 106, and spring end 136 secured to shaft 112 rotates with shaft 112. Relative rotation between shaft 112 and hub 106 results in axial twisting of spring 104.

In the event that the impact is sufficient to loosen the initial tight fit between thrust bearing 102 and hub 106, then propeller shaft 112 may continue to rotate relative to hub 106 until spring 104 is completely rotated to its maximum rotation. If the forces are not sufficient to cause spring 104 to break, spring 104 then causes the propeller to once again rotate with shaft 112 in a limp home mode.

The operational condition in which spring 104 is twisted yet hub 106 remains in a tight fit with bearing 102 is sometimes referred to herein as the resilient operation mode of propeller assembly 100. The operational condition in which spring 104 is completely rotated and hub 106 is not in a tight fit with bearing is sometimes referred to herein as the limp home operation mode of propeller assembly 100.

Propeller assembly 100 can be utilized on many different types of marine engines. By utilizing a spring rather than a drive sleeve specifically configured for a particular propeller shaft, it is believed assembly 100 can be readily secured to many different engines.

It also is contemplated that the thrust bearing or the spring, or both, could be sold in kit form. For example, different kits containing different bearings and springs specified for particular engine types could be provided. In one specific embodiment, a kit includes both a thrust bearing and a spring. Of course, washers and nuts also could be provided in such kits.

From the preceding description of various embodiments of the present invention, it is evident that the objectives of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A propeller assembly for being secured to a propeller shaft of a marine engine, said propeller assembly comprising:
   a thrust bearing comprising a hub mating surface and a bore therethrough, said bearing bore sized so that said bearing forms a tight fit with the propeller shaft,
   a propeller comprising a hub and a plurality of blades extending from said hub, a bore extending through said hub, and
   a spring having a first end and a second end, said first spring end having a larger diameter than said second spring end, said first spring end positioned adjacent to and not within said thrust bearing and secured to an inner surface of said propeller hub bore, said second spring end sized to form a tight fit with the propeller shaft.

2. A propeller assembly in accordance with claim 1 wherein a said spring first end is welded to said hub.

3. A propeller assembly in accordance with claim 1 wherein said spring comprises a spiral wound spring fabricated from spring steel.

4. A propeller assembly in accordance with claim 1 wherein the propeller shaft has an inclined surface, and said thrust bearing bore comprises a surface for forming a tight fit with the propeller shaft inclined surface.

5. A propeller assembly in accordance with claim 1 further comprising a washer and a nut for securing said thrust bearing and said propeller to the propeller shaft.

6. A spring for a propeller assembly to secure a propeller to a propeller shaft, said spring comprising a first end and a second end, said spring first end having a larger diameter than said spring second end, said spring first end configured to be secured to a propeller hub and external to a thrust bearing, and said spring second end configured to be secured to a propeller shaft.

7. A spring in accordance with claim 6 wherein said spring is spiral wound.

8. A spring in accordance with claim 6 wherein said spring is fabricated from spring steel.

9. A kit for securing a propeller to a propeller shaft of a marine engine, said kit comprising:
   a spring comprising a first end and a second end, said spring first end having a larger diameter than said spring second end, said spring first end configured to be secured to a propeller hub, and said spring second end configured to be secured to the propeller shaft, and
   a thrust bearing comprising a bore extending therethrough, and a propeller hub mating surface for forming a tight fit with the propeller hub.

10. A kit in accordance with claim 9 wherein said spring is spiral wound.

11. A kit in accordance with claim 9 wherein said spring is fabricated from spring steel.

12. A kit in accordance with claim 9 wherein said thrust bearing bore comprises an inclined inner surface for mating with an inclined surface of the propeller shaft.

13. A kit in accordance with claim 9 wherein said bearing is fabricated from steel.

14. A method for securing a propeller to a propeller shaft of a marine engine, said method comprising the steps of:
   inserting a thrust bearing over the propeller shaft, and
   pushing a propeller including a propeller hub having a spring secured therein over the propeller shaft so that the propeller shaft extends through the propeller hub and is in a tight fit with one end of the spring.

15. A method in accordance with claim 14 further comprising the step of tightening a threaded nut on the propeller shaft to secure the propeller assembly to the shaft.

16. A propeller assembly for being secured to a propeller shaft of a marine engine, said propeller assembly comprising:

a thrust bearing comprising a hub mating surface and a bore therethrough, said bearing bore sized so that said bearing forms a tight fit with the propeller shaft, a propeller comprising a hub and a plurality of blades extending from said hub, a bore extending through said hub, and means for securing said propeller to said propeller shaft, said means comprising a spring secured at a first end to said propeller and external to said thrust bearing and secured a second end to said propeller shaft.

17. A propeller assembly in accordance with claim 16 wherein said spring first end is welded to said hub.

18. A propeller assembly in accordance with claim 16 wherein said spring comprises a spiral wound spring fabricated from spring steel.

19. A propeller assembly in accordance with claim 16 wherein the propeller shaft has an inclined surface, and said thrust bearing bore comprises a surface for forming a tight fit with the propeller shaft inclined surface.

20. A propeller assembly in accordance with claim 16 further comprising a washer and a nut for securing said thrust bearing and said propeller to the propeller shaft.

* * * * *